United States Patent [19]

Espiritu

[11] Patent Number: 4,979,657
[45] Date of Patent: Dec. 25, 1990

[54] PORTABLE BEVERAGE CONTAINER

[76] Inventor: Henry P. Espiritu, 2556 Pasadena Ave., Long Beach, Calif. 90806

[21] Appl. No.: 376,501

[22] Filed: Jul. 7, 1989

Related U.S. Application Data

[63] Continuation-in-part of Ser. No. 247,499, Sep. 22, 1988, abandoned.

[51] Int. Cl.$^5$ .............................................. B60R 7/06
[52] U.S. Cl. .......................... 224/42.46 R; 224/901; 224/906; 229/1.5 H; 229/198; 229/904
[58] Field of Search ............... 224/42.46 R, 273, 278, 224/282, 901, 906; 206/562, 565; 229/1.5 H, 198, 904, 197; 220/85 H

[56] References Cited

U.S. PATENT DOCUMENTS

| | | | |
|---|---|---|---|
| 564,594 | 7/1896 | Craw | 4/239 X |
| 967,487 | 8/1910 | Baker | 224/906 X |
| 1,411,555 | 4/1922 | Allen | 229/197 |
| 1,463,448 | 7/1923 | Stern | 229/197 |
| 1,680,661 | 8/1928 | Birrell | 229/197 |
| 1,915,958 | 6/1933 | Skirrow . | |
| 2,465,169 | 3/1949 | O'Connor | 206/562 |
| 2,695,712 | 11/1954 | Kolander . | |
| 2,704,625 | 3/1955 | Huse . | |
| 2,738,882 | 3/1956 | French et al. | 224/42.46 R |
| 2,812,891 | 11/1957 | Carlson et al. . | |
| 2,822,116 | 2/1958 | Smalley et al. | 224/906 X |
| 2,833,458 | 5/1958 | Toensmeier | 229/904 X |
| 2,971,688 | 2/1961 | Akers . | |
| 2,988,206 | 6/1961 | Olson . | |
| 3,181,771 | 5/1965 | Galloway | 229/197 |
| 3,325,079 | 6/1967 | Puckett . | |
| 3,400,875 | 9/1968 | Coe . | |
| 3,899,119 | 8/1975 | Roccaforte | 206/562 |
| 4,034,909 | 7/1977 | Toda | 229/198 X |
| 4,403,786 | 9/1983 | Ulics | 224/273 X |
| 4,432,491 | 2/1984 | Muise | 206/565 |
| 4,837,865 | 6/1989 | Roth | 229/904 X |

FOREIGN PATENT DOCUMENTS

| | | | |
|---|---|---|---|
| 2948279 | 6/1981 | Fed. Rep. of Germany | 206/562 |
| 671383 | 8/1989 | Switzerland | 229/198 |
| 17825 | 8/1904 | United Kingdom | 229/198 |

Primary Examiner—Henry J. Recla
Assistant Examiner—Robert M. Fetsuga
Attorney, Agent, or Firm—Charles H. Thomas

[57] ABSTRACT

A portable beverage container carrier for an automotive vehicle is formed of a single sheet of flat, stiffened material, such as cardboard, formed with creases to create a rectangular floor, a front, a back and sides. A pair of arms extend laterally from the front and back and are adaptable for insertion into slots in the sides. The arms terminate in hook and loop fabric fasteners which are engageable with mating fabric fasteners on the inside surfaces of the side panels. The front, back and sides can thereby be folded up from the floor panel to form a tray. The front and sides are provided with reinforcement flaps that are foldable inwardly to reinforce the structure of the tray. One of the side flaps is formed with an articulated intermediate panel having apertures therein to receive accessories, such as straws and plastic eating implements. The sheet of stiffened material is formed with a detachable section that can be folded into a dihedral to form an adjustable brace. A hanger opening in the back panel allows the carrier to be hung from a hook on the dashboard, and the brace props the tray up to hold the floor panel in a substantially horizontal disposition.

16 Claims, 8 Drawing Sheets

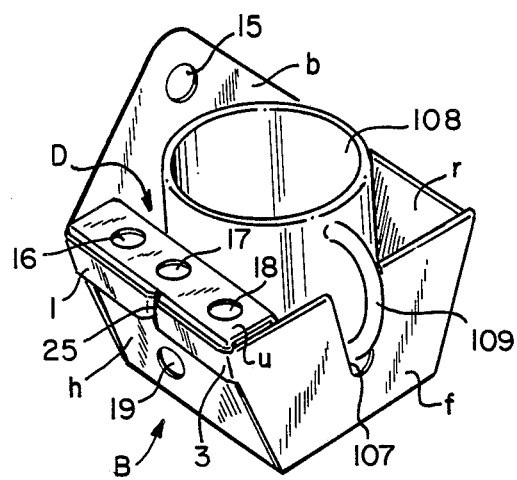
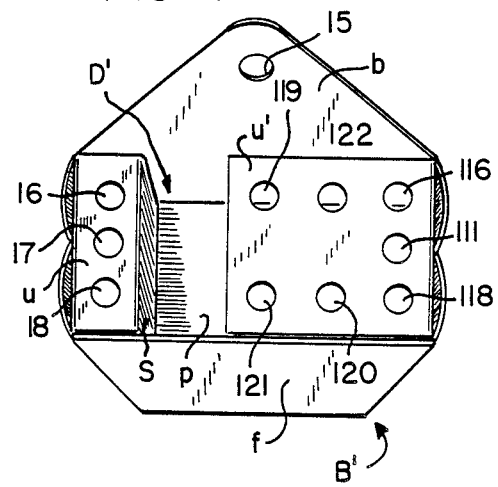
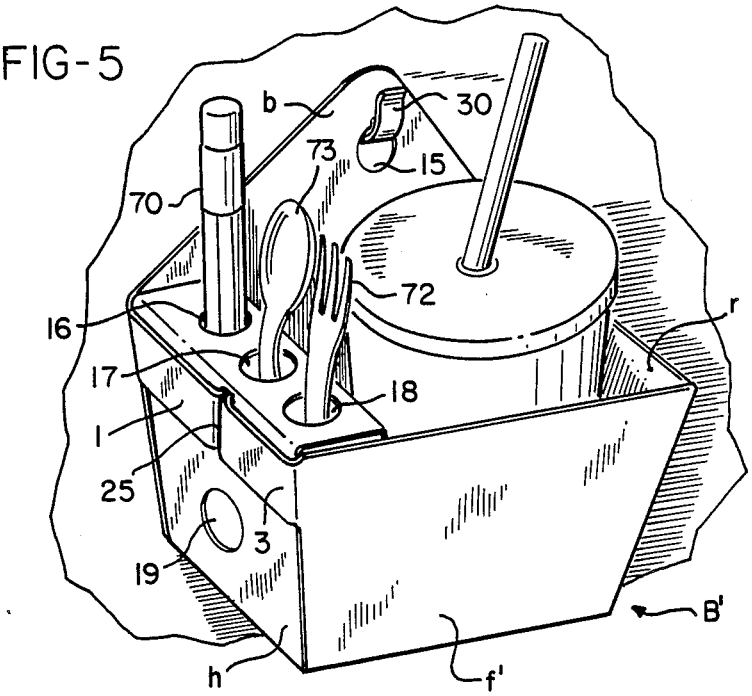

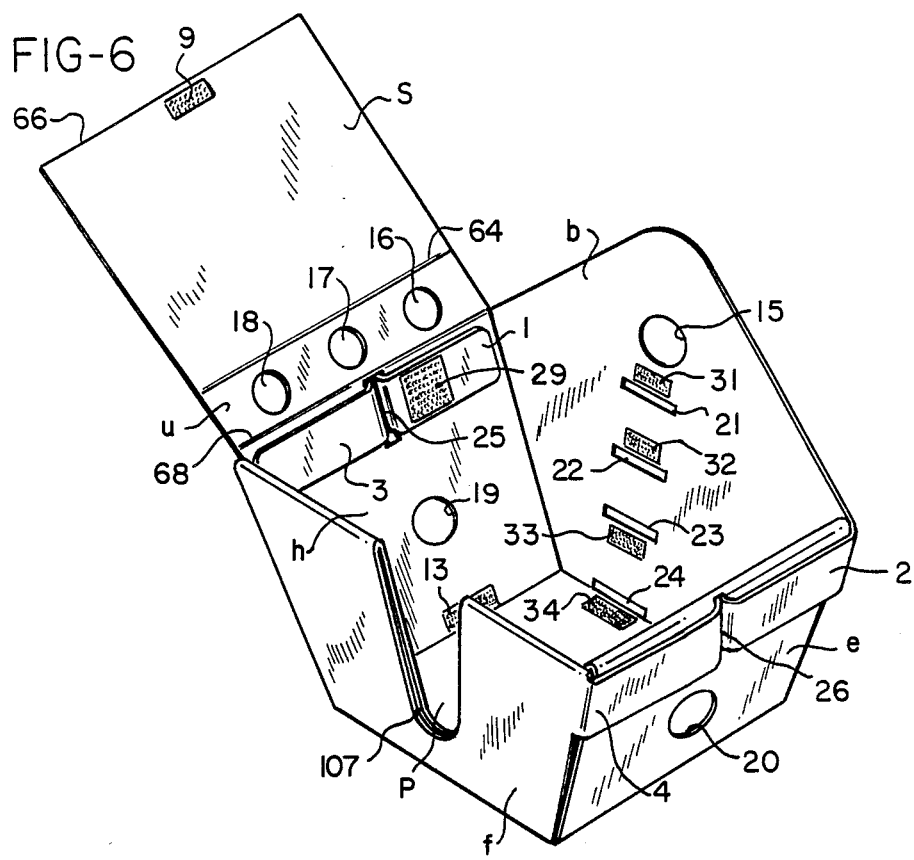
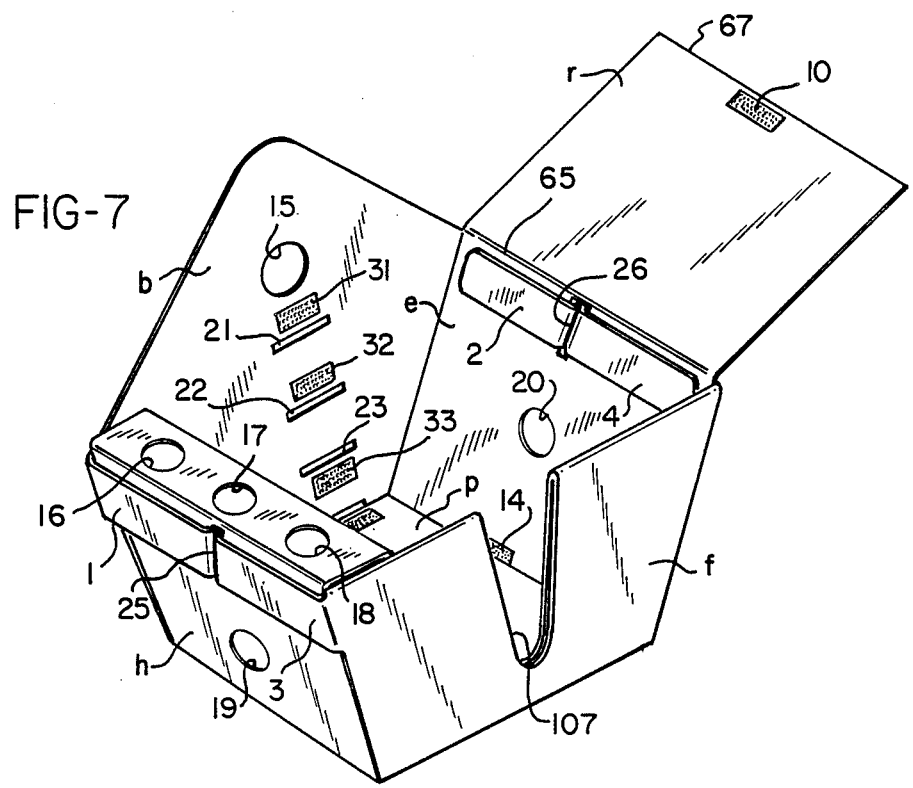

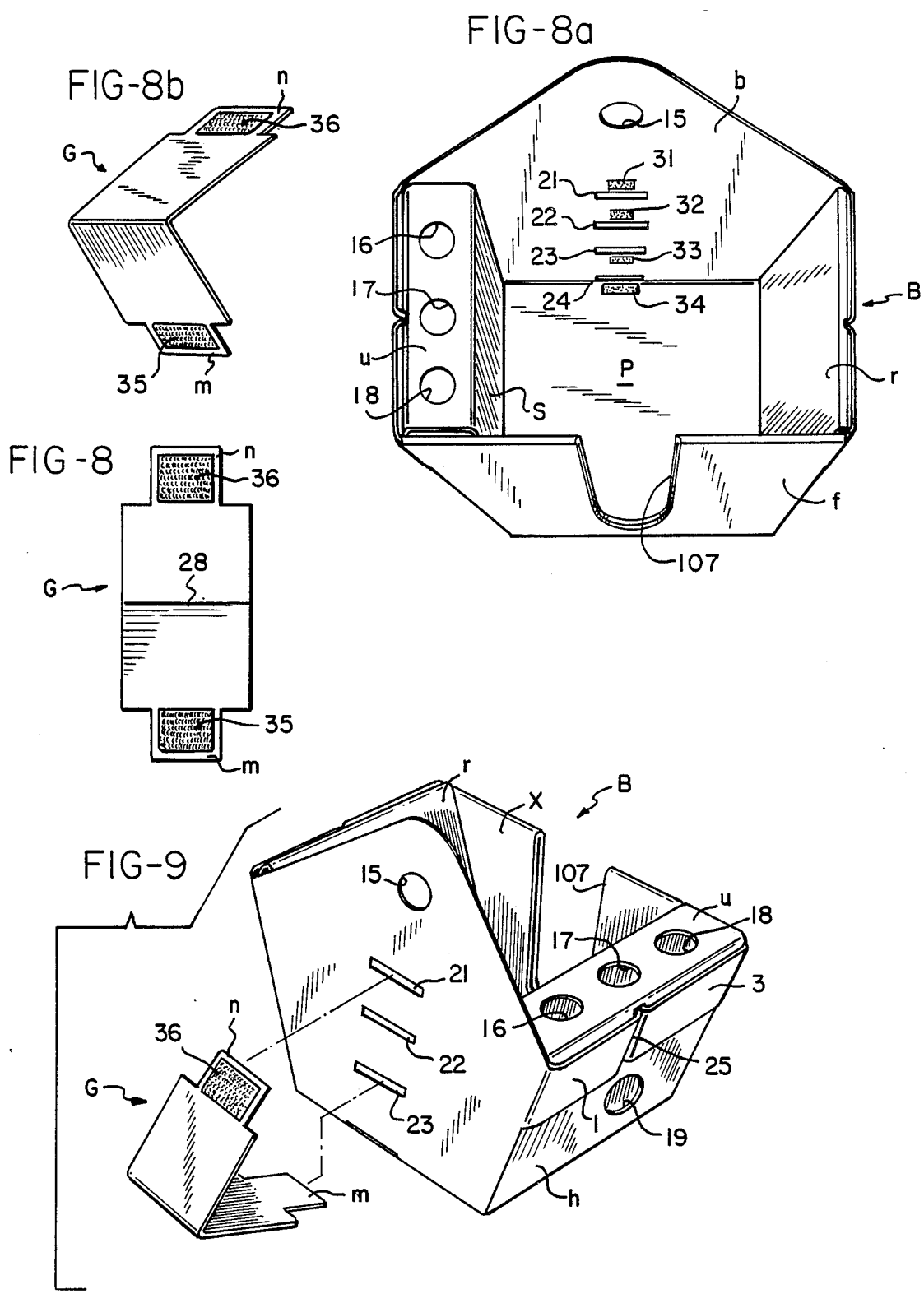

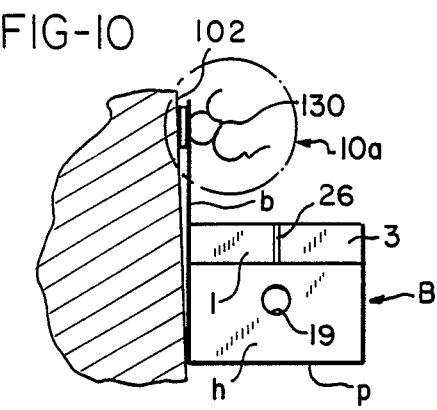
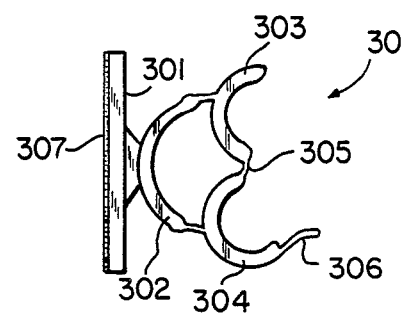
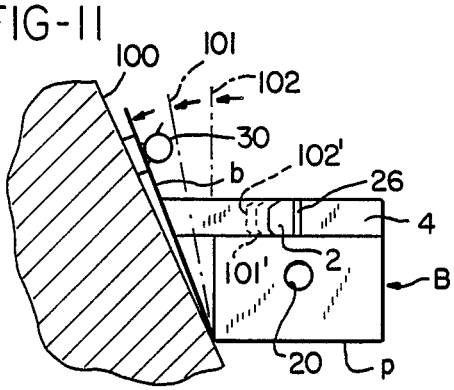
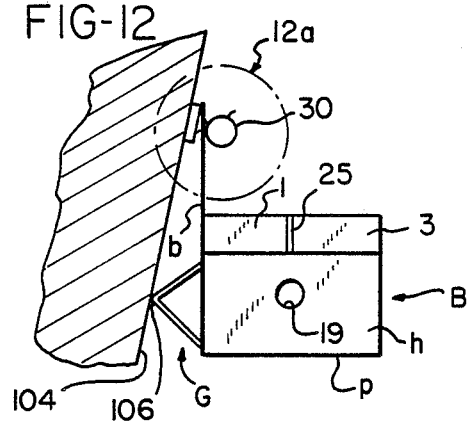
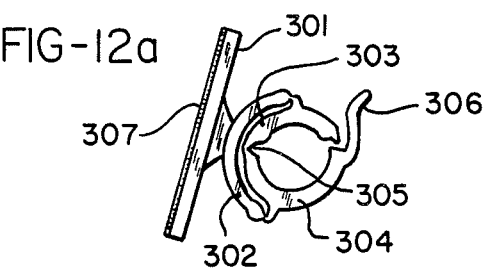
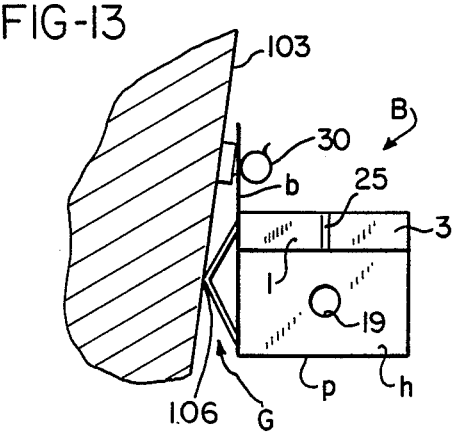
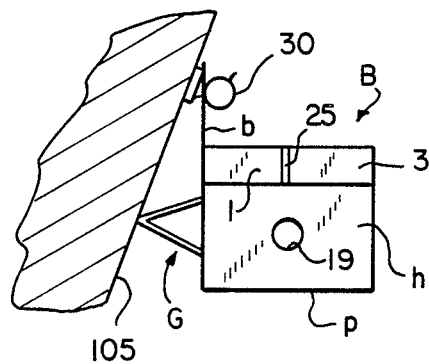

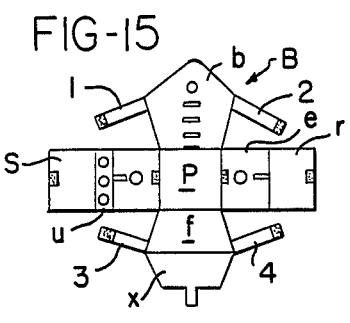
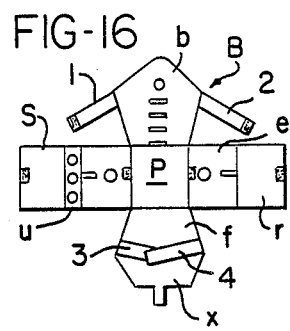
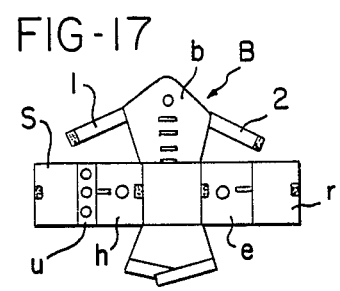
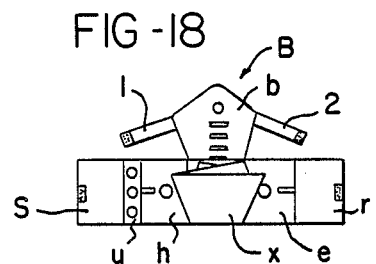
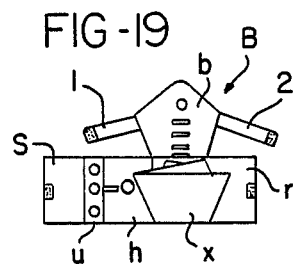
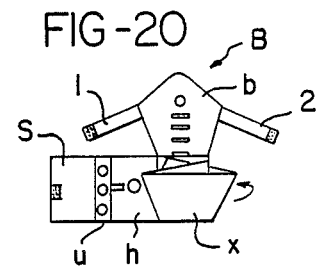
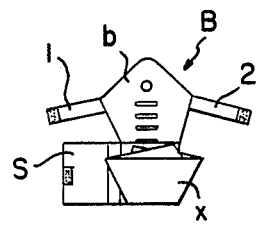
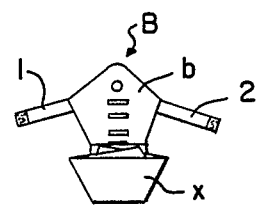
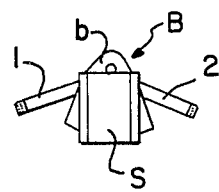
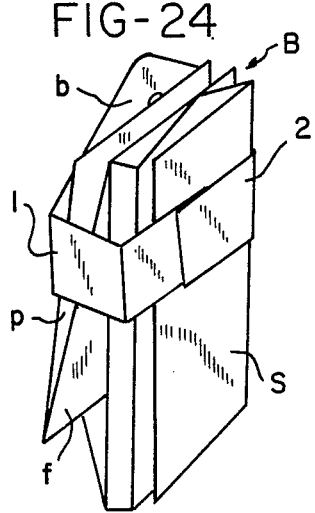
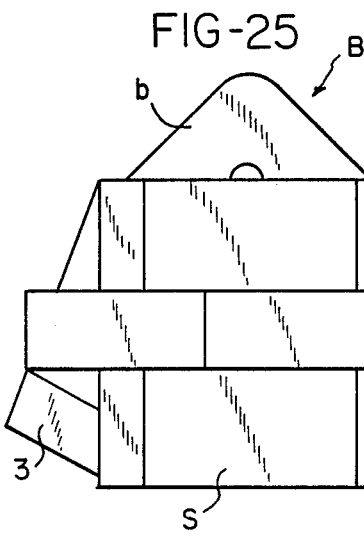
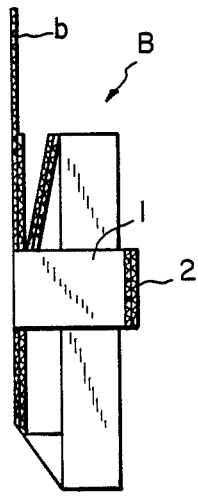

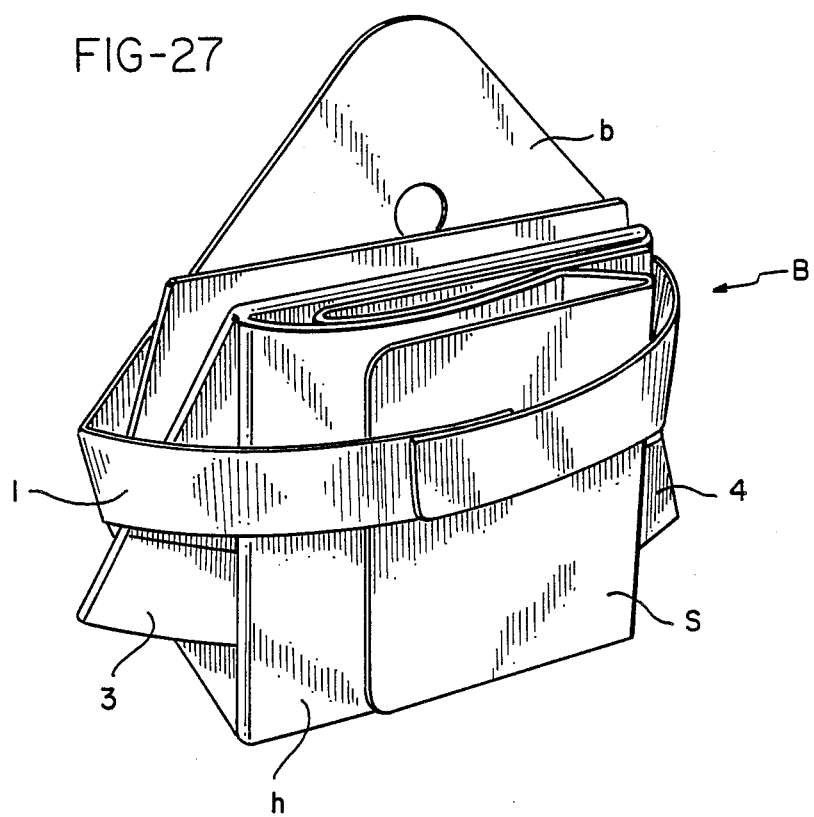

PORTABLE BEVERAGE CONTAINER

BACKGROUND OF THE INVENTION

The present application is a continuation-in-part of U.S. Application Ser. No. 247,499, filed on Sept. 22, 1988.

FIELD OF THE INVENTION

The present invention relates to an improved portable beverage container carrier which can be folded to form a tray that can be hung from the dashboard of an automotive vehicle.

DESCRIPTION OF THE PRIOR ART

Fast food establishments specializing in orders for food and drink that are consumed off premises continue to thrive and grow. The popularity of purchasing such take out orders for consumption in an automotive vehicle has greatly increased in recent years. However, the types of beverage container carriers designed for use in carrying beverage containers in an automotive vehicle, have proven to be unsatisfactory in several respects.

Conventional non-disposable beverage container carriers which are commercially available and which are designed for use in holding beverages in an automotive vehicle have by and large been rather bulky and have presented storage difficulties when not in use. Specifically, conventional beverage carriers which are commercially available are formed of relatively rigid plastic which define permanent, non-collapsible receptacle trays or holders for beverage containers. Such conventional carriers occupy a relatively large volume and cannot be conveniently stored in a glove compartment or elsewhere within an automotive vehicle. Also, conventional beverage container carriers are rather unstable within an automotive vehicle, and tend to sway. Such carriers will even fall when jostled by the motion of a moving vehicle. One such conventional container holder adapted to accommodate a single cup of a specific size is illustrated in U.S. Design Pat. No. Des. 226,623 and is sold under the name Sav-A-Spill by Allied Plastics, Inc. of Gastonia, North Carolina. Another such conventional beverage container carrier is depicted in U.S. Design Pat. No. Des. 251,229 and is sold as the RubberQueen Cup-N-Stuff Holder, model number 25120 by Rubber Queen Pretty Products, Inc. of Coshocton, Ohio.

SUMMARY OF THE INVENTION

The present invention is directed to an improved reusable portable beverage container carrier designed for use in an automotive vehicle. The improved beverage container carrier of the invention is formed of a single sheet of flat, stiffened material which can be folded compactly for ease of storage within a vehicle glove compartment. The portable beverage container carrier of the invention has a plurality of planar panels fabricated from a substantially rigid sheet of material, such as plastic or cardboard. The panels are delineated from each other by creases which allow the panels to be folded from a common plane to form upright front and back panels and side panels between the front and back panels. A pair of arms extend laterally outwardly from either the side panels or the front and back panels and terminate in fasteners which may be releasably secured to hold the front, back and side panels upright to form a concave tray especially suitable for supporting plastic or paper cups of the type in which beverages are served at fast food franchises.

The carrier of the invention may be formed with a detachable section which can be folded to form a rear brace. The back panel is constructed with a hanger aperture, by means of which the tray may be suspended from a hook fastened to a vehicle dashboard. The brace is an adjustable brace adapted to extend rearwardly from the back panel to a selected degree, so as to meet and reside in contact with different automotive vehicle dashboard faces oriented at different angles relative to the horizontal. The brace can thereby be manipulated to support the tray from the rear so as to stabilize the tray with respect to dashboard faces oriented at significantly different angles.

In one broad aspect the present invention is a portable beverage container carrier formed of a single sheet of stiff folded stock comprising a rectangular floor panel bounded on all sides by first and second pairs of creases in the stock. The creases of the first pair are perpendicular to the creases of the second pair. The panels in a first pair of wall panels have linear side edges extending outwardly from the first pair of creases and from the floor panel. The panels in a second pair of wall panels have linear side edges extending outwardly from the second pair of creases. Fastening arms extend laterally from the side edges of the wall panels in one of the pairs of wall panels. Fastening means for the fastening arms are engageable to hold all of the wall panels in fixed orientation relative to the floor panel. The side edges of the wall panels in the first pair meet the side edges of the wall panels in the second pair, thereby defining a concave beverage container receptacle.

Preferably the fastening means for the fastening arms are comprised of a first type of pads of flexible hook and loop fasteners and a second type of pads of flexible hook and loop fasteners that are engageable with pads of the first type. Pads of the first type are permanently secured to the fastening arms. Pads of the second type are located on the wall panels in the other of the pair of wall panels and are disposed for engagement with the pads of the first type on the fastening arms. Suitable mating first and second types of pads of hook and loop fasteners are sold under the registered trademark Velcro.

In a preferred construction of the portable beverage container carrier, a pair of pads of the second type are located on the inside surfaces of each of the wall panels in the pair of wall panels that are provided with fastening arms. These pads of the second type are separated from each other by a slot defined through the structure of each of the wall panels in the other pair. Certain of the fastening arms extend to each of the slots from the first pair of wall panels, passing on the outside surfaces of each of the wall panels in the other pair. The fastening arms pass through the slots and are folded back against the inside surfaces of the wall panels of the other pair, thereby engaging the pads of the first type with the pads of the second type in such a manner as to hold all of the wall panels in a fixed disposition. The wall panels all rise upwardly from the floor panel to thereby define a receptacle adapted to accommodate a beverage container.

The wall panels in the first pair are preferably front and back wall panels, and have fastening arms extending laterally outwardly therefrom, and the wall panels in the other pair are side panels. Each of the side panels is preferably provided with a reinforcement extension flap delineated along a reinforcement flap crease that is parallel to and remote from the creases at which the side wall panels meet the floor panel. These reinforcement extension flaps each extend outwardly to terminate in an extension edge remote from and parallel to their respective reinforcement flap creases.

Each of the side wall panels is provided with a reinforcement flap fastening means on its inside surface adjacent to the crease at which it meets the floor panel, and each of the extension flaps is provided with a reinforcement flap fastening means adjacent its extremity edge. Each reinforcement flap fastening means is engageable with a mating fastening means on the inside surface of the wall panel from which it extends. The reinforcement extension flaps are foldable inwardly along the reinforcement flap creases so that the extension flap edges contact the floor panel and so that the reinforcement flap fastening means on the extension flaps and on the side wall panels are engageable together. This construction provides a double side wall thickness. It also aids in more firmly entrapping the folding fastening arms of the front and back panels between the inner surfaces of the side wall panels and the flap extensions therefrom.

Preferably, the side wall panels are provided with flap disengaging openings, whereby the reinforcement flap fastening means are disengagable by pressing the extension flaps inwardly and away from the inside surfaces of the side wall panels through the flap disengaging openings.

At least one of the extension flaps is preferably formed of an articulated intermediate panel located along the reinforcement flap crease. The articulated intermediate panel has at least one, and preferably a plurality of apertures therein, to receive different implements. For example, the articulated intermediate panel may be constructed with three openings, each of which may alternatively accommodate a straw, a pen, a pencil, a fork, a spoon, a knife or any other such implement.

The front panel is also preferably provided with a front panel reinforcement extension flap delineated along a front panel reinforcement flap crease which is parallel to and remote from the crease at which the front panel meets the floor panel. The front panel reinforcement extension flap is foldable inwardly along the front panel reinforcement extension flap crease at the top of the front panel to bear against and reinforce the front panel.

An elongated slot, preferably about an inch wide is defined through and encompassed within the front panel and within the front panel reinforcement extension flap. This elongated slot extends across the front panel reinforcement flap crease equal distances within the front panel and within the front panel reinforcement extension flap. When the reinforcement flap is folded back against the inside wall of the front panel, the portions of the elongated slot define a gap in the front of the tray to accommodate a cup handle. The portable beverage container carrier may thereby be utilized to hold a non-disposable cup having a handle, such as a ceramic cup.

The back panel may be formed generally in the shape of a pentagon with a hanger opening defined in its upper portion. The hanger opening is adapted to receive a hook by means of which the carrier can be hung from an automotive vehicle dashboard.

Preferably, the back panel is provided with a plurality of mutually parallel brace support slots extending parallel to the creases delineating the back panel and front panel from the floor panel. A stabilizing brace is preferably formed as a removable or separable segment of a single sheet of flat, stiffened material forming the beverage container carrier. The section, when removed, is folded in the shape of a dihedral and serves as a stabilizing brace. The stabilizing brace preferably has end tabs on its opposite edges. The end tab extend into the brace support slots in the back panel.

A first type of hook and loop fabric fastening pads may be formed on the end tabs of the stabilizing brace for engagement with a mating type of hook and loop fabric fastener pads located on the inside surface of the back panel adjacent the brace support slots. The end tabs of the stabilizing brace may be inserted into different ones of the brace support slots so as to vary the angle of the dihedral formed by the brace. This will vary the extent to which the brace extends rearwardly to meet the face of a dashboard located behind the panel. The angle of the dihedral is adjusted so that the stabilizing brace supports the floor panel in a generally horizontal disposition.

The invention may be described with greater clarity and particularity with reference to the accompanying drawings.

DESCRIPTION OF THE DRAWINGS

FIG. 3 is a perspective view illustrating the manner in which a non-disposable cup may be supported in the portable beverage container carrier depicted in FIG. 2.

FIG. 4 is a perspective view of an alternative embodiment of the beverage container carrier to that depicted in FIG. 3.

FIG. 5 is another perspective view of another alternative embodiment of the beverage container carrier to that depicted in FIG. 3 holding a disposable beverage container and other implements.

FIG. 6 is another perspective view of the beverage container carrier of FIG. 3 taken from the opposite side and showing one side panel reinforcement flap unfolded.

FIG. 7 is another perspective view of the portable beverage container carrier of FIG. 3 shown empty and with the other side panel reinforcement flap unfolded.

FIG. 8 illustrates a brace for use in the beverage container carrier of FIG. 3 depicted in isolation.

FIG. 8a illustrates the trace of FIG. 8 folded and the beverage container carrier of FIG. 3 in perspective from above.

FIG. 9 further illustrates the installation of the brace of FIG. 8 into the beverage container carrier of FIG. 3 in a rear perspective view.

FIG. 10 diagrammatically illustrates the manner in which the beverage container carrier is hung from a substantially vertical automotive vehicle dashboard front.

FIG. 10a is an enlarged detail of a portion of FIG. 10.

FIG. 11 diagrammatically illustrates the manner in which the beverage container carrier is supported against an upwardly and forwardly sloping vehicle dashboard front.

FIG. 12 diagrammatically illustrates the manner in which the beverage container carrier is supported against a moderately forwardly and downwardly sloping vehicle dashboard front.

FIG. 12a is an enlarged detail of FIG. 12.

FIG. 13 diagrammatically illustrates the manner in which the beverage container carrier is supported against a slightly forwardly and downwardly sloping vehicle dashboard front.

FIG. 14 diagrammatically illustrates the manner in which the beverage container carrier is supported against a dashboard front having a pronounced downward and forward slope.

FIG. 15 illustrates the embodiment of the beverage container carrier of the invention of FIG. 3 flattened in preparation for storage.

FIG. 16 illustrates a preliminary step in folding the beverage container carrier of FIG. 15 for storage.

FIG. 17 illustrates a further step in folding the beverage container carrier of FIG. 15 for storage.

FIG. 18 illustrates a further sequential step in folding the beverage container carrier of FIG. 15 for storage.

FIG. 19 illustrates still another further sequential step in folding the beverage container carrier of FIG. 15 for storage.

FIG. 20 illustrates still another sequential step in storing the beverage container carrier of FIG. 15.

FIG. 21 illustrates a further step in folding the beverage container carrier of FIG. 15 for storage.

FIG. 22 illustrates a further sequential step in folding the beverage container carrier of FIG. 15 for storage.

FIG. 23 illustrates a further sequential step in folding the beverage container carrier of FIG. 15 for storage.

FIG. 24 is a diagrammatic perspective view showing the beverage container carrier of FIG. 15 completely folded for storage.

FIG. 25 is a front elevational view showing the beverage container carrier of FIG. 15 completely folded for storage.

FIG. 26 is a side elevational view showing the beverage container carrier of FIG. 15 completely folded for storage.

FIG. 27 is another perspective view showing the beverage container carrier of FIG. 15 completely folded for storage in an alternative manner.

DESCRIPTION OF THE EMBODIMENTS

Figure 1:
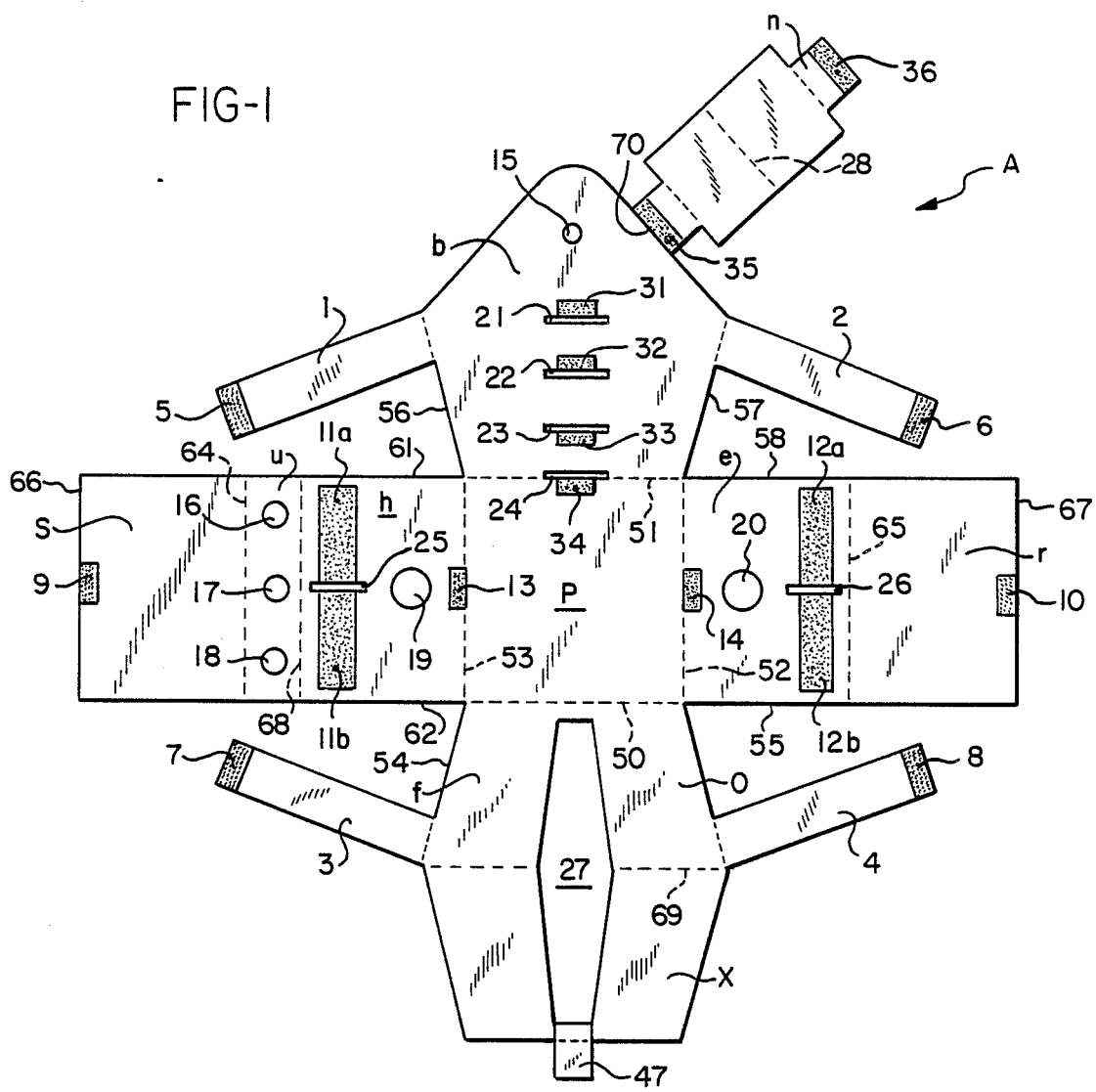
FIG. 1 is a plan view of a single sheet of flat, stiffened material from which a portable beverage container carrier according to the invention is formed.
Figure 2:
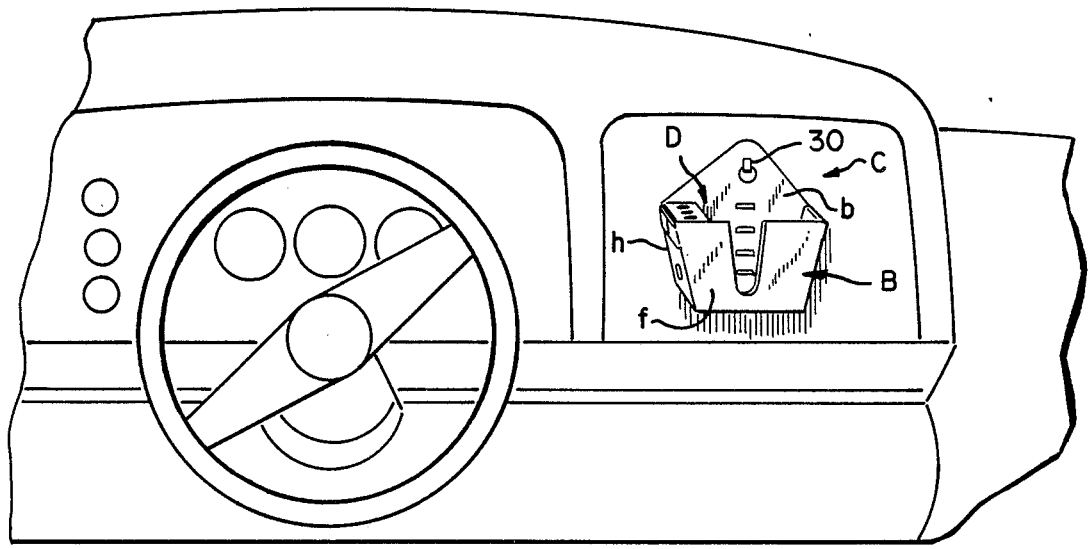
FIG. 2 illustrates a beverage container carrier formed from the sheet of FIG. 1 in use suspended from the dashboard of an automotive vehicle.
Figure 28:
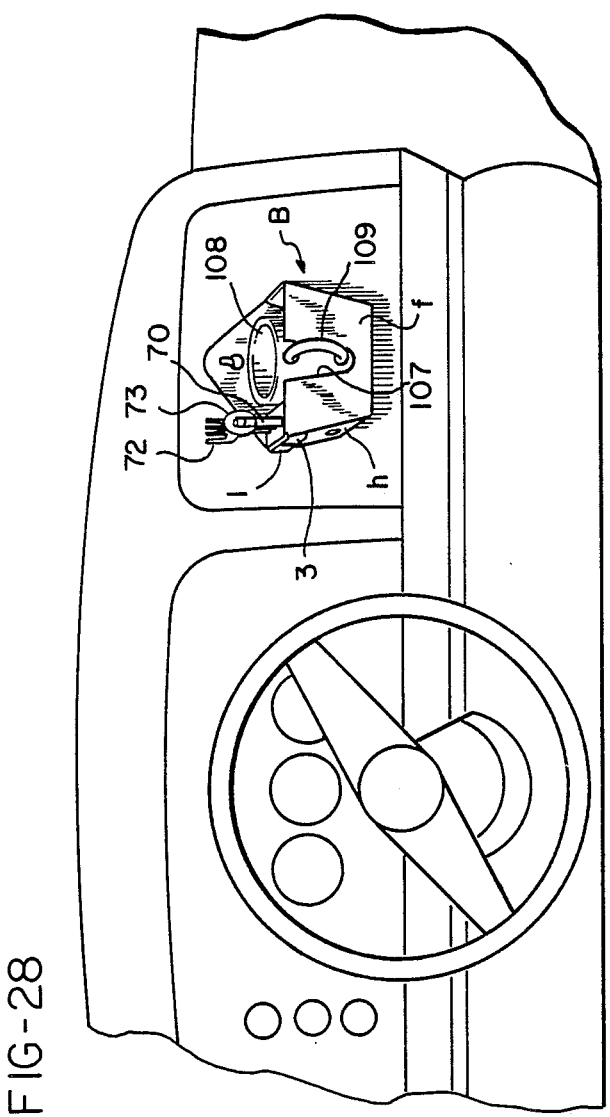
FIG. 28 is another view showing use of the beverage container carrier according to the invention.

FIG. 1 illustrates a single sheet of flat, stiffened material A which is used to form a portable beverage container carrier B, depicted in FIG. 2. In use the carrier B is suspended from the face of a dashboard C of an automotive vehicle.

The single sheet of flat, stiffened material A may be constructed of cardboard, plastic or some other material. The sheet of material A is comprised of a rectangular floor panel p, which may be of square shape four inches on a side. The rectangular floor panel p is bounded by mutually parallel front and back creases 50 and 51, respectively, in the single sheet of material A and by mutually parallel side creases 52 and 53 in the sheet of material A. The creases 50 and 51 form a first pair of creases, while the creases 52 and 53 form a second pair of creases perpendicular to the first pair. The sheet of material A has front and back panels f and b, respectively, which serve as a first pair of wall panels.

The front panel f has linear side edges 54 and 55 extending outwardly from the opposite ends of the crease 50. The back panel b has linear side edges 56 and 57 extending outwardly from opposite ends of the crease 51. The sheet of material A also defines a second pair of opposing side wall panels e and h having linear side edges 58, 60 and 61, 62 respectively. The linear side edges 58 and 60 extend outwardly from opposite ends of the crease 52, while linear side edges 61 and 62 extend outwardly from the opposite ends of crease 53.

Fastening arms 1 and 2 extend laterally from the side edges 56 and 57 of the back panel b while fastening arms 3 and 4 extend laterally from the side edges 54 and 55 of the front panel f. Fastening means, in the form of hook and loop fastener pads 5, 6, 7 and 8 on the fastening arms 1, 2, 3 and 4 are engageable to hold all of the wall panels b, f, e and h in fixed orientation relative to the floor panel p with the side edges 54, 55, 56 and 57 in the first pair of wall panels f and b meeting the side edges 62, 60, 61 and 58, respectively, of the side wall panels h and e in the second pair of wall panels at substantially linear interfaces therebetween, as depicted in FIGS. 2, 3 and 6, for example. As illustrated in FIG. 2, the folded front and back panels f and b and side panels e and h thereby define a concave beverage container receptacle D.

The side panels e and h are each concurrently engageable from opposite sides by separate ones of the fastening arms 1, 2, 3 and 4 extending from the front and back panels f and b. Specifically, the side panel e is engageable from opposite sides by the fastening arms 2 and 4, while the side pane h is engageable from opposite sides by the fastening arms 1 and 3. The fastening arms 1, 2, 3 and 4 hold the front and back panels f and b, respectively, and the side panels e and h in a rigid orientation relative to the floor panel, to thereby form the beverage container receptacle or tray D as depicted in FIG. 2. When the tray D is fully erected, the floor p is bounded by walls f, b, e and h which respectively form a front panel, back panel and side panels.

The fastening means 5, 6, 7, and 8 on the fastening arms 1, 2, 3 and 4 are comprised of a first type of pads of flexible fabric hook and loop fasteners. The pads 5, 6, 7 and 8 are each formed with a multiplicity of minute outwardly projecting flexible hooks. The hooks of the pads 5, 6, 7 and 8 are engageable with a second type of flexible hook and loop fastener pads 11a, 11b, 12a and 12b, which are located on the inside surfaces of the wall panels h and e. The first or hook type fastener pads 5, 6, 7 and 8 are engageable in mating fashion with the second or loop type of hook and loop fastener pads 11a, 11b, 12a and 12b. Fabric fasteners such as these are sold in mating sets under the registered trademark Velcro.

As illustrated in FIG. 1, a pair of pads of the second type are located on the inside surfaces of each of the wall panels h and e. Each of the second type of hook and loop fastener pads is formed with a contact surface which is covered by a looped fabric pile. The flexible hooks of the first type of hook and loop fastener pads 5, 6, 7 and 8 are releasably engageable in the looped pile of the second type of hook and loop fastener pads 11a, 11b, 12a and 12b when the contact surfaces of the respective fastener pads are pressed together.

As illustrated in FIG. 1, the looped pile type fastener pads 11a and 11b are located on the inside surface of the wall panel h while the opposing looped pile type contact fastening pads 12a and 12b are located on the inside surface of the side wall panel e. The pads 11a and 11b on the side wall panel h are separated from each other by a slot 25 defined through the structure of the wall panel h. Similarly, the looped pile fastener pads 12a and 12b are separated from each other by a slot 26 defined through the structure of the side wall panel e.

The fastening arms 1 and 3 extend to the slot 25 in the side wall panel h, passing on the outside surface of the side wall panel h. The fastening arm 1 is inserted through the slot 25, passing from the outside to the inside of the side wall panel h through the slot 25. The end of the fastening arm 1 is folded back toward the side edge 56, thereby bringing the hooked type fastening pad 5 into juxtaposition against the contact surface of the looped type fastening pad 11a. Similarly, the fastening arm 3 is inserted through the slot 25 from the opposite side of the side wall panel h and the extremity of the fastening arm 3 is folded back toward the side edge 54, thereby bringing the hooked type contact pad 7 into juxtaposition against the looped type fastening pad 11b. The hooks of the pad 7 thereby releasably engage the pile of the pad 11b, as illustrated in FIG. 6.

Similarly, the fastening arm 2 of the back panel b is inserted through the slot 26 from the outside of the side wall panel e, and the extremity of the arm 2 is folded back toward the side edge 57 to bring the multiplicity of hooks of the contact pad 6 into engagement with the pile of the pad 12a. Likewise, the fastening arm 4 is inserted through the slot 26 in the outside of the side wall panel e. The end of the fastening arm 4 is folded back toward the side edge 55 so that the fastening pad 8 resides in contact against the fastening pad 12b. The hooks of the fastening pad 8 are thereupon engaged in the looped pile of the fastening pad 12b, as depicted in FIG. 7.

The extremities of the fastening arms 1, 2, 3 and 4 are thereby folded back against the inside surfaces of the wall panels h and e, thereby engaging the pads of the first pads, namely the pads 5, 6, 7 and 8, with the pads of the second type, namely the pads 11a, 12a, 11b and 12b, respectively.

Each of the side wall panels h and e is provide with a reinforcement extension flap s and r, respectively. Each of the reinforcement extension flaps s and r is delineated along a reinforcement flap crease parallel to and remote from the creases at which the side wall panels h and e meet the floor panel p. Specifically, the extension flap s is delineated along a reinforcement flap crease 64 that is parallel to and remote from the crease 53. The reinforcement extension flap r is delineated along a reinforcement flap crease 65 that is parallel to and remote from the crease 52.

Each of the side panel extension flaps s and r extends outwardly to terminate in an extremity edge that is remote from and parallel to the reinforcement flap crease associated therewith. That is, the extension flap s extends outwardly and terminates in an extremity edge 66 that is remote from and parallel to the reinforcement flap crease 64. The extension flap r extends outwardly to terminate in an extremity edge 67 remote from and parallel to the reinforcement flap crease 65.

Each side wall panel h and e is provided with a reinforcement flap fastening means on its inside surface adjacent the crease at which it meets the floor panel p. That is, the side panel h is provided with a reinforcement flap fastening means 13 in the form of a pad having a looped pile, like the pads 11a, 11b, 11c and 11d. Similarly, the side wall panel e is provided with a reinforcement flap fastening pad 14 adjacent the crease 52 at which it meets the floor panel p. The pad 14, like the pad 13, is a pad having a looped pile like the other second type of contact fastening pads 11a, 11b, 11c and 11d.

Each of the extension flaps s and r is provided with a reinforcement flap fastening means adjacent its extremity edge. That is, the extension flap s is provided with a reinforcement flap fastening pad 9 of the first type having a multiplicity of hooks, adjacent its extremity edge 66. The first fastening pad 9 is engageable with the fastening pad 13. Likewise, the extension flap r is provided with a reinforcement flap fastening pad of the first type having a multiplicity of minute hooks adjacent its extremity edge 67. The hooks of the pad 10 are engageable with the pile of the pad 14 on the inside surface of the wall panel e from which the extension flap r extends.

Each of the reinforcement extension flaps s and r is foldable inwardly along its reinforcement flap crease, numbered 64 and 65, respectively, so that the extremity edges 66 and 67 contact the inner surface of the floor panel p. The reinforcement flap fastening pad 9 on the extension flap s is thereby brought into contact with and engageable with the mating pad 13. Similarly, the reinforcement flap fastening pad 10 on the extension flap r is engageable with the contact fastening pad 14.

Each of the side wall panels h and e is formed with a flap disengaging opening. That is, the side panel h has a circular flap disengaging opening 19 defined therethrough. Likewise, the side panel e has a circular disengaging opening 20 defined therethrough. A user may disengage the fastening pad 9 of the flap extension s from the fastening pad 13 of the side wall panel h by pressing a finger from the outside of the tray d inwardly through the circular opening 19 to thereby force the flap extension s away from the side wall panel h, thereby disengaging the pads 9 and 13. The flap extension s can then be rotated upwardly out of the concave receptacle formed by the tray d in hinge-like manner about the crease 64, as depicted in FIG. 6. Similarly, a finger pressed inwardly through the circular flap disengaging opening 20 will force the flap extension r inwardly and away from the side wall panel e, thereby disengaging the hook and loop fastener pads 10 and 14. The flap extension r can thereby be rotated upwardly in hinge-like fashion about the crease 65, as depicted in FIG. 7.

The extension flap s is formed of an articulated intermediate panel u which is located along the reinforcement flap crease 64. The intermediate panel u is delineated from the side wall panel h by another crease 68 which is parallel to both the creases 64 and 53.

When the fastening pads 9 and 13 are engaged with the tray d fully assembled, the intermediate panel u assumes a generally horizontal disposition, as illustrated, for example, in FIGS. 2, 3 and 5, and forms one side of a triangular prism, the other sides of which are formed by the side wall panel h and the remaining portion of the flap extension s. A hollow cavity, generally in the shape of a triangular prism, is thereby defined within the confines of the panels h, u and s.

The articulated intermediate panel u has three apertures, 16, 17 and 18 therein which are adapted to receive different implements. For example, as illustrated in FIG. 5 a pen or pencil 70 may be inserted into the aperture 16 while the handle of a plastic fork 72 may be inserted into the aperture 17. The handle of a plastic spoon 73 may be inserted into the aperture 18. The tray B thereby defines implement holders adjacent to beverage receptacle D.

In the preferred embodiment of the invention, reinforcement flaps are provided not only for the side panels e and h, but also for the front panel f. As illustrated in FIG. 1, the front panel f is provided with a front panel reinforcement extension x delineated along a front panel reinforcement flap crease 69 parallel to and remote from the crease 50 at which the front panel e meets the floor panel p. The front panel reinforcement extension flap x is thereby foldable inwardly along the front panel reinforcement flap crease 69 to bear against and reinforce the front panel f.

The elongated slot 27 extends across the front panel reinforcement flap crease 69 equal distances within the front panel f and the front panel reinforcement extension flap x to thereby define a cup handle receiving gap 107, as depicted in FIGS. 2, 3 and 27. The front panel reinforcement extension flap x must be folded along the crease 69 before the side panel extension flaps s and r are folded, respectively, along the creases 64 and 65, since the front panel reinforcement extension flap x must be entrapped behind the articulated intermediate panel u. A pull tab 47 on the extension flap x facilitates pulling the flap x out of the receptacle D to flatten out the carrier B in preparation for storage. When the carrier B is formed with the gap 107, it is suitable for carrying a disposable coffee cup 108 having a rearward extending handle 109. The handle 109 extends into the gap 107 and is stabilized by the structure of the front panel f and the front panel extension flap x at the edges of the slot 27.

FIG. 4 illustrates an alternative embodiment of a portable beverage container carrier B' in which an articulated intermediate panel u' is formed on the other side of the carrier B' opposite the intermediate panel u. The articulated intermediate panel u' is broader than the opposite intermediate panel u and defines seven different openings, 116, 117, 118, 119, 120, 121 and 122 adjacent to the beverage container receptacle D'.

As illustrated in FIG. 1, the back panel b is provided with a plurality of mutually parallel brace support slots 21, 22, 23 and 24. The slots 21–24 extend parallel to the creases 50 and 51 in the first pair of creases. The portable beverage container carrier B is further comprised of a stabilizing brace G. The brace G is formed of a separable segment 28 of the sheet of stiff, folded material or stock A. The detachable section 28 is separable from the remainder of the sheet A along a line of perforation 70, depicted in FIG. 1. The segment 28, once separated from the remaining portion of the stock A, is folded in half in the shape of a dihedral as depicted in FIGS. 8a and 9. The brace G has end tabs m and n on its edges. The end tabs m and n extend into selected ones of the brace support slots 21, 22, 23 and 24 in the back panel b.

The end tabs m and n of the dihedral brace G are provided with fastening pads 35 and 36 of the first type, having a multiplicity of minute hooks thereon. These pads 35 and 36, formed respectively on the end tabs m and n of the dihedral brace G are engageable in the looped pile of mating pads of the second type, 31, 32, 33 and 34, which are mounted within the receptacle D adjacent to the brace support slots 21–24. The looped type fastening pads 31, 32 and 33 are permanently secured on the inside surface of the back panel b respectively adjacent to the brace support slots 21, 22 and 23. The looped type fastening pad 34 is permanently secured to the floor panel p closely adjacent to the crease 51 and to the brace support slot 24.

To secure the dihedral brace G in position, as depicted in FIGS. 12, 13 and 14, the end tabs m and n are inserted into selected ones of the slots 21, 22, 23 and 24 and the fastening pads 35 and 36 are engaged with corresponding ones of the fastening pads 31–33 on the inside of the receptacle D.

The back panel b is formed generally in the shape of a pentagon and has a circular hanger opening 15 defined in its upper portion. The circular opening 15 is adapted to receive any suitable hook, which may be permanently or semipermanently secured to the dash panel. One suitable hook 30 is depicted in FIGS. 10 through 14 and is illustrated in detail in FIGS. 10a and 12a. The hook 30 may be of the type described in U.S. Pat. No. 4,240,604. The hook 30 is formed of plastic and has a flat base 301 from which an arcuately shaped pedestal 302 extends outwardly. The ends of the pedestal 302 terminate in webs which are joined to arcuate plastic sections 303 and 304. The juxtaposed ends of the arcuate sections 303 and 304 are joined together by another web 305. The end of the arcuate plastic section 304 opposite the web 305 terminates in a flange or tang 306 which can be pulled outwardly, as illustrated in FIG. 10a, or collapsed, as illustrated in FIG. 12a.

The back side of the base 301 is coated with a layer of pressure sensitive adhesive 307, which is covered until it is to be secured to the face of the dashboard by a protective paper having a release coating thereon. To utilize the hook 30, the protective release coated paper is removed and the adhesive layer 307 on the back of the base 301 is pressed against the face of the dashboard to which the portable beverage container carrier B is to be mounted. The pressure sensitive adhesive layer 307 will hold the hook 30 permanently on the face of the dashboard.

When the carrier B is to be mounted on a dashboard, such as the dashboard 100 depicted in FIG. 11, the hook 30 is first permanently secured to the face of the dashboard 100 in the manner described. The component elements of the hook 30 are then collapsed together by squeezing the tang 306 and the remote portion of the arcuate plastic section 303 together. The hook 30 will then snap shut from the opened condition depicted in FIG. 10a to the closed configuration illustrated in FIG. 12a.

While the hook 30 is in this closed configuration the assembled portable beverage container carrier B is brought toward the hook 30, and the hanger opening 15 defined in base b is pressed against the hook 30 on the dashboard 100. When the hook 30 is in the closed configuration depicted in FIG. 12a, it will readily pass through the hanger opening 15. The flange 306 of the hook 30 is then pulled away from the arcuate section 303, thus opening the hook elements to the orientation of FIG. 10 so that they will no longer pass through the hanger opening 15. The back panel b will thereafter be held against the dashboard 100 while the hook 30 remains open in the configuration depicted in FIG. 10a. The beverage container carrier B can only be removed by first collapsing the hook 30 from the extended position of its component elements, depicted in FIG. 10a, to the collapsed disposition depicted in FIG. 12a. Only when the hook 30 has been collapsed as depicted in FIG. 12a will it pass through the hanger opening 15 so that the receptacle B can be removed from the hook 30. Another alternative form of a hook 30' is depicted in FIG. 5. The hook 30' likewise is held by pressure sensitive to a dashboard face.

The portable beverage container carrier B is extremely versatile and can be mounted on dashboards having virtually any slope. For example, FIG. 11 illustrates a dashboard 100 the face of which is inclined upwardly and rearwardly. For clarity of illustration and explanation the carrier B should be considered as viewed in section in FIG. 11. To properly mount the carrier B such that the floor panel p is substantially horizontal, the reach of the fastening arms 1 and 2 must be adjusted. That is, when the dashboard has an extreme forward and upward incline, such as the dashboard 100 illustrated in solid lines in FIG. 11, only the very tips of the fastening arms 1 and 2 will be inserted, respectively, through the slots 25 and 26. The fastening pads 5 and 6 thereof will engage those portions of the mating fastening pads 11a and 12a only in the regions thereof immediately adjacent to the slots 25 and 26, likewise as depicted in solid lines in FIG. 11.

With a dashboard having a less extreme upward and forward slope, such as illustrated in dashed lines at 101 in FIG. 11, the fastening arms 1 and 2 will be advanced further into the slots 25 and 26, as illustrated by the position indicated in dashed lines at 101'. In dashboards which are essentially vertical, such as illustrated in dashed lines at 102 in FIG. 11, the fastening arms 1 and 2 will be drawn as far into the slots 25 and 26 as possible, thereby bringing the side edges 56 and 61 of the back panel b and the side panel h into juxtaposition and the side edges 57 and 58 of the back panel b and side panel e into juxtaposition. The extreme ends of the fastening arms 1 and 2 will then be brought fully rearwardly to the position indicated in dashed lines at 102' in FIG. 11.

Once the reach of the arms 1 and 2 has been adjusted so that the back panel b is supported against the dashboard while still holding the floor panel p in a horizontal disposition, the flap extensions r and s are then folded down against the side wall panels e and h, respectively.

Some automotive vehicle dashboards do not slope upwardly and forwardly, like the dashboard 100, but to the contrary slope downwardly and forwardly, such as the dashboards 103, 104 and 105, depicted in FIGS. 12, 13 and 14. FIG. 12 illustrates a dashboard 104 having a moderate downward and forward incline. As a consequence, the back panel b is not directly supported from the rear by the dashboard 104 if the floor panel p is to be kept in a horizontal disposition. To stabilize and support the back panel b and to hold the floor panel p in a horizontal disposition, the brace G is utilized.

Where the downward and forward incline is only slight such as that of the dashboard 103 depicted in FIG. 13, the end tab m of the brace G is inserted into slot 24 while the end tab n is inserted into slot 21. Fastening pad 35 is then pressed against the mating fastening pad 34 while fastening pad 36 is pressed against the mating fastening pad 31. The dihedral brace G will thus form a large, obtuse angle and the apex 106 of the brace G will extend rearwardly from the back panel b only a short distance. The brace G will thereby support the back panel b in an upright, generally vertical disposition while concurrently supporting the floor panel p in a generally horizontal disposition. The brace G not only provides proper orientation to hold the floor panel p horizontally disposed, but it also aids in stabilizing the carrier b to prevent it from swinging with movement of the automotive vehicle.

Where the downward and forward inclination of a dashboard 104 is greater, such as depicted in FIG. 12, the brace G is disposed in a different manner. Specifically, in order to support the back panel b in a vertical disposition while concurrently supporting the floor panel p in a horizontal disposition, the end tab m is still inserted into the slot 24 and the hook and loop fastener 35 is engaged with the mating fastener 34 on the bottom panel p. However, the other end tab n is inserted into the slot 22 instead of the slot 21. The fastening pad 36 is thereupon engaged with the mating fastening pad 32, rather than the pad 31. When the brace G is disposed in this manner the dihedral angle formed is an acute angle and the apex 106 of the brace G extends significantly further to the rear than when the brace G is deployed as depicted in FIG. 13. The back panel b is thereby still supported from the rear in an upright generally vertical disposition, due to contact of the apex 105 with the dashboard 104. As in FIG. 13, the floor panel p is then held in a horizontal disposition.

In a vehicle in which the dashboard 105 slopes downwardly and forwardly at an extreme angle, the brace G is employed as depicted in FIG. 14. In this arrangement the end tab m of the brace G is inserted into the slot 23 and the fastening pad 35 is engaged with the mating fastening pad 33. The other end tab n is inserted into the slot 22. The fastening pad 36 is then engaged with the mating fastening pad 32. The brace G then forms a dihedral encompassing only a very small acute angle. The back panel b is thereby maintained in a substantially vertical orientation while the floor panel p is held in a horizontal disposition.

A highly advantageous feature of the beverage container carrier of the invention is that it can be readily stored in a very compact manner when not in use. To store the beverage container carrier B, the carrier is first removed from the hook 30 by closing the hook 30 as illustrated in FIG. 12a and merely pulling the carrier B away from the dashboard so that the hook 30 passes through the hanger opening 15. Pressing inwardly with fingers on either side through the openings 19 and 20, the fastener 9 is dislodged from the fastening pad 13 and the fastener pad 10 is dislodged from the fastener pad 14. The side panel extension flaps s and r are then folded outwardly away from the floor panel p. The front panel extension flap x is pulled upwardly by means of the pull tab 47 and is likewise folded outwardly and away from the floor panel p. The fastening pads 5, 6, 7 and 8 are thereupon accessible and may be peeled back, respectively, from the fastening pads 11a, 12a, 11b and 12b. The carrier B is thereupon flattened, as illustrated in FIG. 15, substantially into the same flat sheet of material A from which it was formed, with the exception that the section 28 is no longer attached to the back panel b.

To fold the carrier B, the fastening arms 3 and 4 are folded together as illustrated in FIG. 16. The front panel reinforcement extension flap x is then folded back outwardly along the crease 69 away from the inwardly folded arms 3 and 4 and against the outwardly facing surface of the front panel f as illustrated in FIG. 17. The front panel f is then folded inwardly against the upwardly facing surface of the floor panel p as illustrated in FIG. 18.

The side panel reinforcement extension flap r is then folded inwardly to reengage the fastening pads 10 and 14, as illustrated in FIG. 19. The front panel f must be lifted slightly from the floor panel p to permit passage of the side panel extension flap r. The side panel e is then folded back under the underside of the floor panel p, as illustrated in FIG. 20. The end of the side panel extension flap s is then folded inwardly against the intermediate panel u and the side panel h, as illustrated in FIG. 21, and the side panel h is then folded back under the side panel extension flap r and extension flap e, which have already been folded against the underside of the floor panel p, as illustrated in FIG. 22.

All of the panels x, f, p, r, e, s, u and h are then folded forwardly against the interior surface of the back panel b, as illustrated in FIG. 23. The fastening arm 1 is then folded inwardly so that the fastening pad 5 resides in contact with the exposed surface of the side panel extension flap s. As illustrated in FIG. 6, the fastening arm 1 has a fastening pad 29 of the second type with looped pile on its backside, opposite from the surface bearing the hooked contact pad 5 of the first type. The fastening arm 2 is then folded inwardly toward the arm 1, which has already been folded, thereby bringing the first type of contact pad 6 into engagement with the second type of contact pad 29, thereby totally collapsing the beverage container carrier B, and holding it in a compact, collapsed package, as depicted in FIGS. 24, 25, and 26. The brace G can be easily inserted between the front panel f and the front panel reinforcement extension flap x. The collapsed carrier B can thereby be readily stored within a vehicle glove compartment while occupying only a very minimal space within the glove compartment.

FIG. 27 illustrates an alternative manner in which the carrier B can be collapsed and stored.

Undoubtedly, numerous variations and modifications of the invention will become readily apparent to those familiar with automotive vehicle beverage carrying devices. Accordingly, the scope of the invention should not be construed as limited to the specific embodiments depicted and described herein, but rather is defined in the claims appended hereto.

I claim:

1. A portable beverage container carrier formed of a single sheet of stiff, folded stock comprising: a rectangular floor panel bounded on all sides by first and second pairs of creases in said stock, wherein said creases of said first pair are perpendicular to said creases of said second pair, a first pair of wall panels having linear side edges extending outwardly from said first pair of creases, wherein one of said wall panels in said first pair is a front panel and the other of said wall panels in said first pair is a back panel, and said back panel is provided with a plurality of mutually parallel brace support slots extending parallel to said creases in said first pair of creases, and further comprising a stabilizing brace formed in the shape of a dihedral and having end tabs on its edges which extend into said brace support slots in said back panel, a second pair of wall panels having linear side edges extending outwardly from said second pair of creases, fastening arms extending laterally from the side edges of said wall panels in one of said pairs of wall panels, fastening means for said fastening arms engageable to hold all of said wall panels in fixed orientation relative to said floor panel with said side edges of said wall panels in said first pair meeting said side edges of said wall panels in said second pair, including first fastening elements disposed on said fastening arms and second fastening elements disposed on the other of said pairs of wall panels, thereby defining a concave beverage container receptacle in which said first and second fastening elements are mutually engaged with each other at said wall panels in said other pair and above said floor panel, whereby said floor panel resides within the confines of said wall panels in an upwardly facing, exposed condition.

2. A portable beverage container carrier according to claim 1 wherein said brace supporting slots are more numerous than said end tabs, whereby said end tabs are insertable into different selected slots to vary the angle of said dihedral.

3. A portable beverage container carrier according to claim 2 wherein said back panel and said end tabs are equipped with mutually engageable brace fastening means.

4. A portable beverage container carrier according to claim 1 further characterized in that said dihedral brace is formed of a separable segment of said sheet of stiff folded stock.

5. A portable beverage container carrier according to claim 1 wherein said front panel is provided with a front panel reinforcement flap crease parallel to and remote from the crease at which said front panel meets said floor panel, whereby said front panel reinforcement extension flap is foldable inwardly into said receptacle along said front panel reinforcement flap crease to bear against and reinforce said front panel.

6. A portable beverage container carrier according to claim 5 wherein an elongated slot is defined through and encompassed within said front panel and within said front panel reinforcement flap and extends across said front panel reinforcement flap crease equal distances within said front panel and said front panel reinforcement extension flap, to thereby define a cup handle receiving gap when said front panel reinforcement extension flap is folded to bear against said front panel.

7. A portable beverage container holder formed of a single foldable, stiffened sheet of material and comprising a rectangular floor panel, front and back panels extending at creases from opposite mutually parallel first and second sides of said floor panel and each including a pair of fastening arms that extend laterally in opposite directions from each other, wherein each of said arms is provided with a fastening means, a pair of side panels extending at creases from opposite mutually parallel third and fourth sides of said floor panel, and said side panels are each concurrently engageable from opposite sides by separate ones of said fastening arms extending from said front and back panels, whereby said fastening arms hold said front and back panels and said side panels in a rigid orientation relative to said floor panel to thereby form a beverage container tray having a floor bounded by walls formed by said front panel, said back panel and said side panels and further comprising a hanger opening defined in said back panel by which to suspend said tray, and an adjustable brace formed from said sheet of material and separable therefrom and attachable to said back panel to bear against a structure located behind said tray to hold said tray at a selected orientation.

8. A portable beverage container carrier formed of a single sheet of stiff, folded stock comprising: a rectangular floor panel bounded on all sides by first and second pairs of creases in said stock, wherein said creases of said first pair are perpendicular to said creases of said second pair, a first pair of wall panels having linear side edges extending outwardly from said first pair of creases, a second pair of wall panels having linear side edges extending outwardly from said second pair of creases, fastening arms extending laterally from the side edges of said wall panels in said first pair of wall panels, fastening means for said fastening arms engageable to hold all of said wall panels in fixed orientation relative to said floor panel with said side edges of said wall panels in said first pair meeting said side edges of said wall panels in said second pair, wherein said fastening means for said fastening arms are comprised of fasteners of a first type and fasteners of a second type that are engageable with said fasteners of said first type, and said fasteners of said first type are permanently secured to said fastening arms and said fasteners of said second type are permanently secured on said wall panels in said second pair of wall panels and disposed for engagement with said fasteners of said first type on said fastening arms, thereby defining a concave beverage container receptacle, and wherein said wall panels have inside and outside surfaces and wherein a pair of fasteners of said second type are located on said inside surfaces of each of said wall panels in said second pair and are separated from each other by a slot defined through the structure of each of said wall panels in said second pair, whereby ones of said fastening arms extend to each of said slots, passing on said outside surfaces of each of said wall panels in said second pair, and said fastening arms pass through said slots and are folded back against said inside surfaces of said wall panels of said second pair, thereby engaging said fasteners of said first type with said fasteners of said second type.

9. A portable beverage container carrier according to claim 8 wherein said fastening means is comprised of flexible hook and loop fasteners.

10. A portable beverage container carrier according to claim 8 wherein each of said wall panels in said second pair is provided with a reinforcement extension flap delineated along a reinforcement flap crease parallel to and remote from the creases at which said wall panels in said second pair meet said floor panel, and extending outwardly to terminate in an extremity edge remote from and parallel to said reinforcement flap crease, and each of said wall panels in said second pair is provided with a reinforcement flap fastening means on its inside surface adjacent the crease at which it meets said floor panel, and each of said extension flaps is provided with a reinforcement flap fastening means adjacent its extremity edge and engageable with said fastening means on said inside surface of the wall panel from which it extends, whereby said reinforcement flaps are foldable inwardly along said reinforcement flap creases so that said extremity edges contact said floor panel and so that said reinforcement flap fastening means on said extension flaps and said reinforcement flap fastening means on said wall panels in said second pair are engageable together.

11. A portable beverage container carrier according to claim 10 further comprising flap disengaging openings in wall panels in said second pair, whereby said reinforcement flap fastening means are disengagable by pressing said extension flaps inwardly and away from said inside surfaces of said wall panels in said second pair through said flap disengaging openings.

12. A portable beverage container carrier according to claim 10 further characterized in that at least one of said reinforcement flaps is formed by an articulated intermediate panel located along said reinforcement flap crease, and said articulated intermediate panel has at least one aperture therein to receive an implement.

13. A portable beverage container holder according to claim 7 wherein said fastening means are comprised of mutually engageable hook and loop fasteners including a first type of element having a multiplicity of minute hooks and a second type of element having a looped pile that is releasably engageable by said hooks.

14. A portable beverage container holder according to claim 7 further comprising reinforcement flaps formed as extensions of each of said front and side panels and delineated therefrom by reinforcement flap creases respectively parallel to and remote from said creases between said floor panel and said front and side panels, whereby said reinforcement flaps are foldable inwardly along said reinforcement flap creases to reinforce said front and side panels.

15. A portable beverage container carrier formed of a single, sheet of flat, stiffened material comprising a rectangular floor panel bounded by mutually parallel front and back creases in said sheet of material and by mutually parallel side creases in said sheet of material which are perpendicular to said front and back creases, a front panel having linear side edges extending laterally outwardly from opposite ends of said front crease, a pair of front panel arms extending laterally in opposite directions from said front panel side edges, first fastening means disposed on said front panel arms, a back panel having linear side edges extending outwardly from opposite ends of said back crease, a pair of back panel arms extending laterally in opposite directions from said back panel side edges and having first fastening means disposed on said back panel arms, a pair of side panels extending outwardly from said side creases of said floor panel and each having linear front and back edges extending outwardly from said ends of said front and back creases, respectively, second fastening means disposed on said side panels above said floor panel, whereby said first fastening means disposed on said arms are engageable with said second fastening means on said side panels to hold said front, back and side panels in a fixed disposition rising upwardly from said floor panel and surrounding said floor panel whereby said floor panel resides in an upwardly facing, exposed condition, to thereby define a receptacle adapted to accommodate a beverage container, and wherein said side panels each have opposite inside and outside surfaces and wherein an arm receiving slot is defined in each of said side panels, and each arm receiving slot is adapted to receive an arm from both said front panel and said back panel, and said arms are insertable through said arm receiving slots from the outside and are securable by said fastening means to the inside surfaces of said side panels.

16. A portable beverage container carrier according to claim 15 further comprising reinforcement flaps extending from said front and side panels and foldable inwardly therefrom for reinforcement thereof.

* * * * *